April 2, 1929.  B. F. RAIDT  1,707,874
VISOR LIGHT
Filed Sept. 10, 1927  3 Sheets-Sheet 1

Byron Frederick Raidt
INVENTOR

BY Victor J. Evans
ATTORNEY

WITNESS:

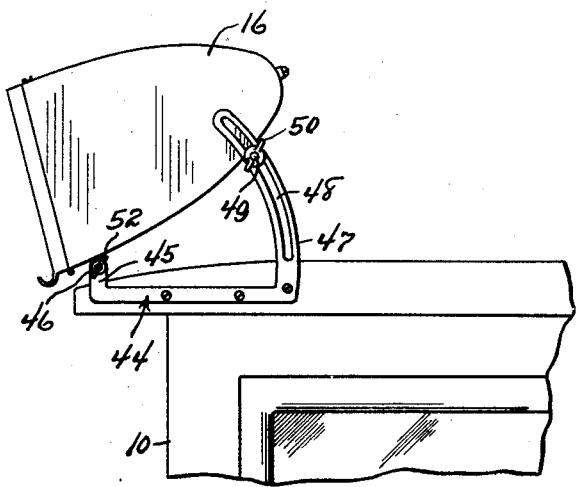
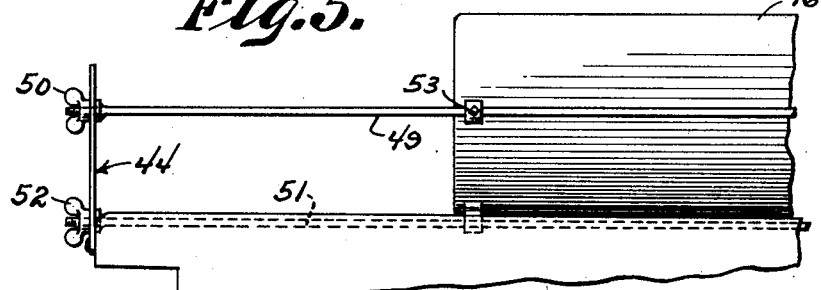
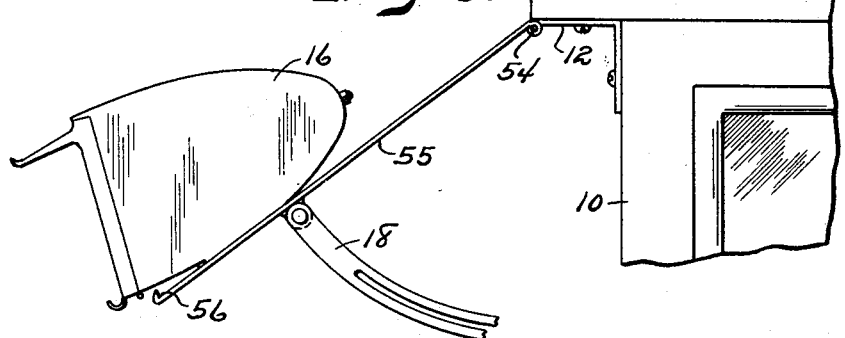

April 2, 1929.   B. F. RAIDT   1,707,874
VISOR LIGHT
Filed Sept. 10, 1927   3 Sheets-Sheet 3

Byron Frederick Raidt
INVENTOR

BY *Victor J. Evans*
ATTORNEY

WITNESS: *John Donovan*

Patented Apr. 2, 1929.

1,707,874

UNITED STATES PATENT OFFICE.

BYRON FREDERICK RAIDT, OF SHENANDOAH, IOWA.

VISOR LIGHT.

Application filed September 10, 1927. Serial No. 218,652.

This invention relates to vehicle lamps, and has for an object the provision of a lamp of novel construction which is adapted to throw a wide beam of light in advance of a vehicle so as to illuminate the entire width of the roadway.

Another object of the invention is the provision of means for mounting the lamp so that it may be adjusted laterally of the vehicle, or pivotally adjusted, or both, so that the direction of light rays may be accurately regulated.

Another object of the invention is the provision of means for adjustably mounting a lamp upon the visor of a vehicle, and for adjusting the inclination of the visor, so that the latter may be adjusted to suit the driver of the vehicle, and the lamp independently adjusted to properly direct its rays.

With the above and other objects in view, the invention further includes the following novel features and details of construction, to be hereinafter more fully described, illustrated in the accompanying drawings and pointed out in the appended claims.

In the drawings:—

Figure 4 is a view similar to Figure 1 showing a slightly different form of the invention.

Figure 5 is a top plan view of the form of the invention shown in Figure 4.

Figure 6 is a fragmentary side elevation showing another means of mounting the lamp.

Figure 1:
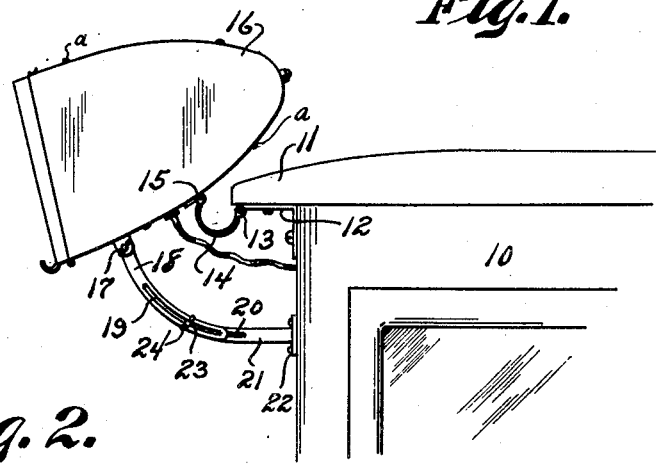
Figure 1 is a fragmentary side elevation showing a portion of a vehicle with the invention applied.

Referring to the drawings in detail wherein like characters of reference denote corresponding parts, the reference character 10 indicates a portion of an automobile the particular type shown being a closed automobile, although the invention may be applied to an open or other type of vehicle.

In the form of vehicle shown, a sun and rain visor 11 extends forwardly at the top of the vehicle and secured beneath this visor is an angle plate 12. Hingedly secured to the forward edge of this angle plate as shown at 13 is a gutter 14 which is adapted to extend across the front edge of the visor. The outer edge of this gutter is hingedly secured as at 15 to a lamp casing 16, so that the gutter in addition to serving its usual function also serves to hingedly secure the lamp casing to the vehicle.

The lamp is adapted to be adjusted to regulate the direction of its light rays and for this purpose, the casing 16 has pivotally secured thereto as shown at 17, arcuate arms 18. These arms are provided with slots 19 which register with slots 20 provided in arcuate arms 21, the latter being rigidly secured to the vehicle as shown at 22. Bolts 23 extend through the slots 19 and 20 and have mounted thereon binding nuts 24 so that the inclination of the lamp may be regulated.

Figure 2:
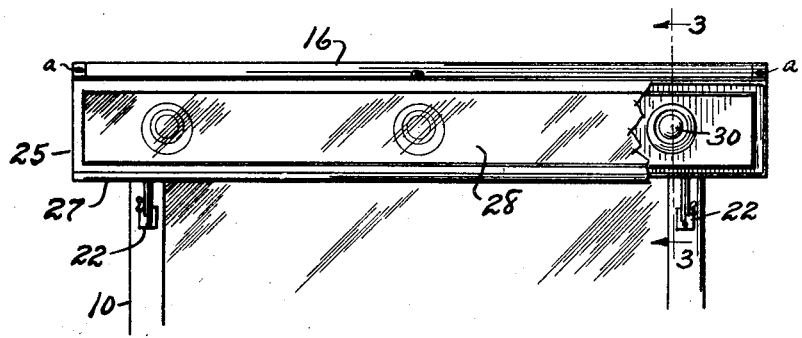
Figure 2 is a front view of the same partly broken away.
Figure 3:
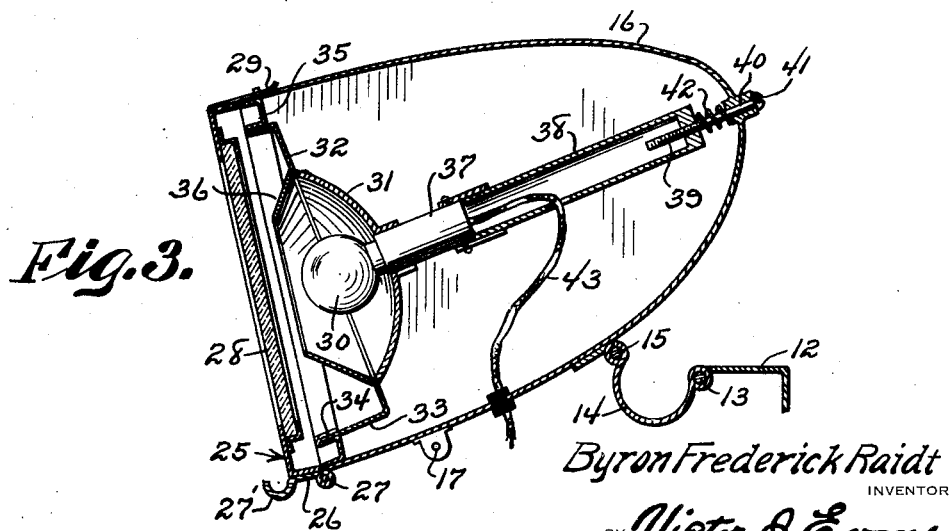
Figure 3 is an enlarged section on the line 3—3 of Figure 2.

The lamp casing is elongated in shape as shown in Figure 2 of the drawings and may extend entirely across the width of the vehicle, or it may extend only a portion of the width. The casing 16 is provided at its front end with a frame 25. The lower member 26 of this frame has its rear edge hingedly secured to the casing as shown at 27, while the front edge of the member 26 is extended to provide a gutter 27'. A lens 28 is carried by the frame 25 and the latter is held in closed position by a latch 29.

Located within the casing are spaced lamps 30 behind which are positioned reflectors 31. These reflectors are carried by a plate 32 and the latter is provided with upper and lower parallel flanges 33. The flanges 33 are received within grooves 34 provided in the frame 35, the latter being secured in the front end of the casing 16, the flanges 33 frictionally engaging the walls of the grooves. The plate 32 also carries shields 36 which extend from the edges of the reflectors 31 and are substantially frusto conical in shape.

The lamps 30 are mounted in sockets 37 which are carried by the reflectors 31, and from which extend tubular members 38 which have a threaded engagement with rods 39. These rods extend through sleeves 40 carried by the casing 16 and their outer ends are provided with kerfed heads 41 so as to permit of convenient adjustment. A spring 42 surrounds each of the rods 39 and bears against the inner end of the tubular member 38 and the adjacent end of the sleeve. Current is supplied to the lamps 30 from a suitable source through conductors 43.

If desired, the lamp may extend for only a portion of the width of the vehicle and may be adjusted transversely of the vehicle as well as pivotally, as shown in Figures 4 and 5 of the drawings. In these figures, brackets 44 are mounted at opposite sides of the vehicle and the forward ends of these brackets are provided with ears 45, for pivotal connection with the front end of the lamp as shown at 46. Extending from the rear ends of the brackets are arcuate arms 47 having slots 48 therein. Extending through the slots 48 and through ears carried by the lamp is a rod 49 which has mounted upon its opposite ends binding nuts 50. The pivotal mounting 46 at the front end of the lamp is also in the nature of a rod 51 which extends through the ears 45 and through ears carried by the lamp casing, with binding nuts 52 mounted on the ends of the rod. The lamp may thus be pivotally adjusted as previously described so as to regulate the inclination of the light rays. In addition, the lamp may be also adjusted transversely of the vehicle, being slit along the rods 49 and 51 and held against sliding movement by means of a bolt 53 which extends through the ears of the lamp casing 16.

In Figure 6, the angle plate 12 has hingedly secured thereto as shown at 54 a sun and rain visor 55. This visor may be adjusted in accordance with the wishes of the driver of the vehicle through slotted arms 18 etc. as described in connection with Figure 1 of the drawings. The lamp casing 16 is rigidly mounted upon the visor 55 and the latter is provided at its forward end with a gutter 56.

Figure 7:
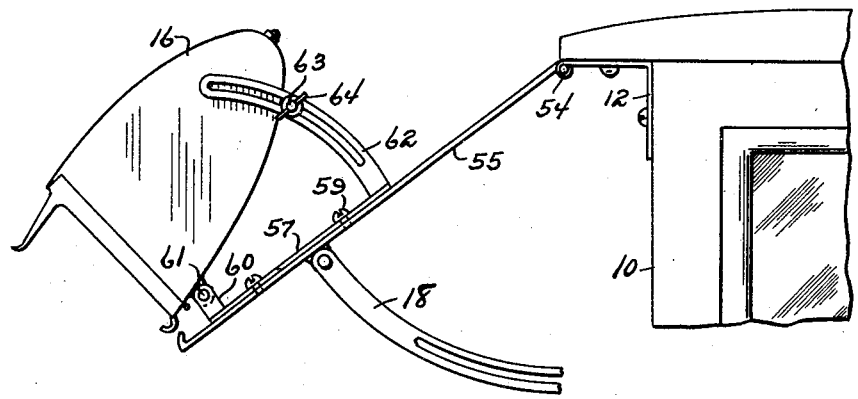
Figure 7 is a similar view showing still another form of mounting the light.
Figure 8:
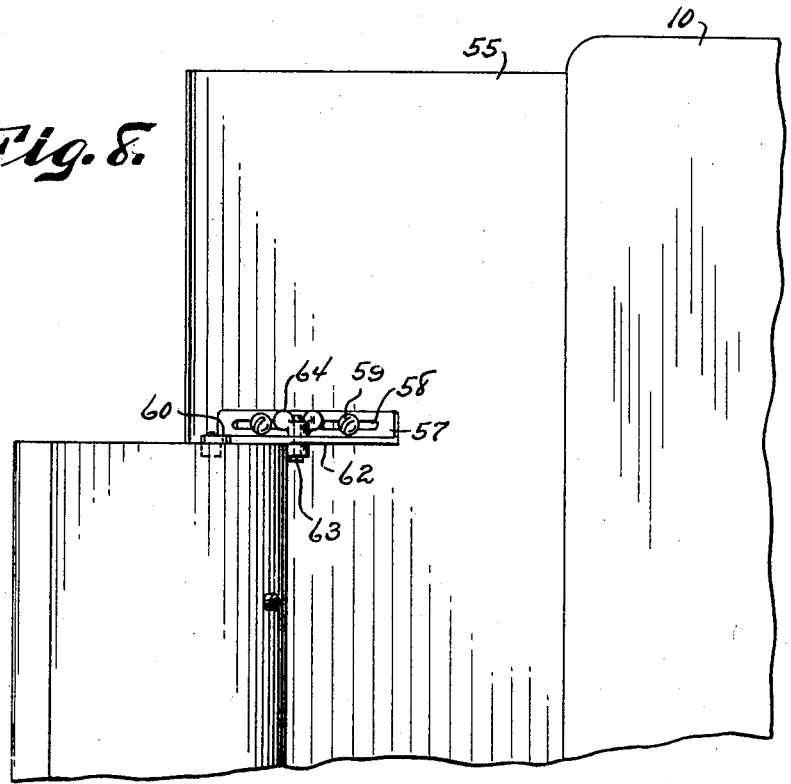
Figure 8 is a fragmentary plan view of the form of the invention shown in Figure 7.

In Figures 7 and 8, the lamp casing 16 is adjustably mounted upon the visor 55 and the latter is hingedly secured as at 54 to the vehicle and is adjustable through the arms 18 etc.

Adjustably mounted upon the visor are brackets 57. These brackets are provided with slots 58 through which extend fastening devices 59 so that the brackets may be adjusted transversely of the visor. The brackets 57 carry ears 60 which are hingedly secured to the casing as shown at 61, while slotted arcuate arms 62 extend from the rear ends of the brackets. These arms receive bolts 63 upon which are mounted binding nuts 64, so that the lamp casing may be adjusted upon the visor.

The lamp casing 16 may be constructed and assembled in any suitable manner. For example, the ends of the casing may be removably secured in place by means of screws $a$.

The invention is susceptible of various changes in its form, proportions and minor details of construction and the right is herein reserved to make such changes as properly fall within the scope of the appended claims.

Having described the invention what is claimed is:—

1. In combination with a vehicle, a lamp, a transversely curved member having one edge hingedly secured to the front edge of the vehicle top, means hingedly securing the opposite edge of said member to the lamp whereby the latter may be adjusted with respect to the vehicle and means to hold the lamp in adjusted position.

2. In a lamp, a casing open at the front, a lens at the front of the casing, a frame secured within the front end of said casing and having upper and lower grooves therein, a reflector, a lamp mounted centrally of the reflector and means carried by the reflector for frictional engagement with the walls of the groove.

3. In a lamp, a casing open at the front, a lens at the front of the casing, a frame secured within the front end of said casing and having upper and lower grooves therein, a reflector, a lamp mounted centrally of the reflector, means carried by the reflector for frictional engagement with the walls of the groove and means to yieldingly force the reflector carried means into the grooves.

In testimony whereof I affix my signature.

BYRON F. RAIDT.